United States Patent
Athanasios et al.

(10) Patent No.: US 7,702,045 B2
(45) Date of Patent: Apr. 20, 2010

(54) METHOD FOR ESTIMATING WIRELESS CHANNEL PARAMETERS

(75) Inventors: Doukas Athanasios, Leivadeia (GR); Kalivas Grigorios, Kato Syhena (GR)

(73) Assignee: Theta Microelectronics, Inc., San Jose, CA (US)

( * ) Notice: Subject to any disclaimer, the term of this patent is extended or adjusted under 35 U.S.C. 154(b) by 1155 days.

(21) Appl. No.: 11/214,217

(22) Filed: Aug. 29, 2005

(65) Prior Publication Data

US 2006/0045194 A1 Mar. 2, 2006

Related U.S. Application Data

(60) Provisional application No. 60/605,512, filed on Aug. 31, 2004.

(51) Int. Cl.
  *H04L 27/06* (2006.01)
(52) U.S. Cl. ..................................... 375/342
(58) Field of Classification Search ................ 375/260, 375/340–343, 346; 370/208, 210
  See application file for complete search history.

(56) References Cited

U.S. PATENT DOCUMENTS

| 4,750,147 | A | | 6/1988 | Roy, III et al. |
|---|---|---|---|---|
| 5,406,593 | A | | 4/1995 | Chennakeshu et al. |
| 5,872,816 | A | * | 2/1999 | Parr et al. .................... 375/341 |
| 6,298,092 | B1 | | 10/2001 | Heath, Jr. et al. |
| 6,553,082 | B2 | | 4/2003 | Jechoux et al. |
| 6,587,526 | B1 | | 7/2003 | Li et al. |
| 6,647,055 | B2 | | 11/2003 | Kuo |
| 6,795,392 | B1 | * | 9/2004 | Li et al. ....................... 370/210 |
| 6,795,513 | B2 | | 9/2004 | Jechoux et al. |
| 6,853,681 | B1 | | 2/2005 | Lindoff |
| 6,907,092 | B1 | | 6/2005 | Yakhnich et al. |
| 6,931,054 | B2 | | 8/2005 | Schmidt et al. |
| 7,012,881 | B2 | * | 3/2006 | Kim ........................... 370/208 |
| 7,206,290 | B2 | * | 4/2007 | Qi et al. ....................... 370/252 |
| 7,305,050 | B2 | * | 12/2007 | Krupka ........................ 375/340 |
| 2002/0037737 | A1 | | 3/2002 | Learned et al. |
| 2003/0012308 | A1 | * | 1/2003 | Sampath et al. ............. 375/340 |
| 2004/0127223 | A1 | | 7/2004 | Li et al. |
| 2005/0141657 | A1 | * | 6/2005 | Maltsev et al. .............. 375/346 |

OTHER PUBLICATIONS

Van De Beek, Jan-Jaap et al., "On Channel Estimation in OFDM Systems", Vehicular Technology Conference, 1995, pp. 815-819.
Liu, Hui et al., "Recent Developments in Blind Channel Equalization: From Cyclostationarity to Subspaces", Signal Processing, Special Issue on Subspace Methods, Part I: Array Signal Processing and Subspace Computations, Apr. 1996, vol. 50, Issue 1-2.

(Continued)

*Primary Examiner*—Khanh C Tran
(74) *Attorney, Agent, or Firm*—Blakely Sokoloff Taylor & Zafman LLP (57) ABSTRACT

Method for the estimation of channel parameters in a wireless communication system. In accordance with the method several levels of the wireless channel parameters estimation take place to address the specific requirements of the channel. Based on the level of estimation required an appropriate estimation algorithm is selected to achieve the desired results. The evaluation of the channel state and thereafter determining the appropriate parameter estimation requirements provide for a superior overall performance of the wireless system.

22 Claims, 7 Drawing Sheets

OTHER PUBLICATIONS

Vanderveen, Michaela C. et al., "Estimation of Multipath Parameters in Wireless Communications", IEEE Transactions on Signal Processing, Mar. 1998, vol. 46, No. 3, pp. 682-691.

Negi, Rohit et al., "Pilot Tone Selection for Channel Estimation in a Mobile OFDM System", IEEE Transactions on Consumer Electronics, Aug. 1998, vol. 44, No. 3, pp. 1122-1128.

Witrisal, K. et al., "RMS delay spread estimation technique using non-coherent channel measurements", IEEE Electronics Letters, Oct. 1, 1998, vol. 34, No. 20, pp. 1918-1919.

Balachandran, Krishna et al., "Channel Quality Estimation and Rate Adaptation for Cellular Mobile Radio", IEEE Journal on Selected Areas in Communications, Jul. 1999, vol. 17, No. 7, pp. 1244-1256.

Chen, Jiunn-Tsair et al., "Multichannel MLSE Equalizer with Parametric FIR Channel Identification", IEEE Transactions on Vehicular Technology, Nov. 1999, vol. 48, No. 6, pp. 1923-1935.

Yeh, Che-Shen et al., "Channel Estimation Using Pilot Tones in OFDM Systems", IEEE Transactions on Broadcasting, Dec. 1999, vol. 45, No. 4, pp. 400-409.

Edfors, Ove et al., "Analysis of DFT-Based Channel Estimators for OFDM", Wireless Personal Communications, 2000, vol. 12, pp. 55-70.

Minn, Hlaing et al., "An Investigation into Time-Domain Approach for OFDM Channel Estimation", IEEE Transactions on Broadcasting, Dec. 2000, vol. 46, No. 4, pp. 240-248.

ETSI Technical Specification 101 475 V1.3.1, Broadband Radio Access Networks (BRAN); Hiperlan Type 2; Physical (PHY) layer, European Telecommunications Standards Institute, 2001, pp. 1-43.

Zhou, Shengli et al., "Finite-Alphabet Based Channel Estimation for OFDM and Related Multicarrier Systems", IEEE Transactions on Communications, Aug. 2001, vol. 49, No. 8, pp. 1402-1414.

Morelli, Michele et al., "A Comparison of Pilot-Aided Channel Estimation Methods for OFDM Systems", IEEE Transactions on Signal Processing, Dec. 2001, vol. 49, No. 12, pp. 3065-3073.

Minn, Hlaing et al., "A Reduced Complexity Channel Estimation for OFDM Systems With Transmit Diversity in Mobile Wireless Channels", IEEE Transactions on Communications, May 2002, vol. 50, No. 5, pp. 799-807.

Deneire, Luc et al., "A Low-Complexity ML Channel Estimator for OFDM", IEEE Transactions on Communications, Feb. 2003, vol. 51, No. 2, pp. 135-140.

De Almeida, A. L. F. et al., "A Two-Stage Receiver for Co-channel Interference Cancellation in Space-Time Block-Coded Systems over Frequency Selective Channels", XX Simposio Brasileiro de Telecomunicacoes, Oct. 2003, Rio de Janeiro.

Zhang, Zhao-Yang et al., "A novel OFDM transmission scheme with length-adaptive Cyclic Prefix", Journal of Zhejiang University Science, 2004, vol. 5, No. 11, pp. 1336-1342.

* cited by examiner

| Exemplary Parameter Values for Guaranteed Satisfactory Transmission for Coarse Channel Estimation | | | | |
|---|---|---|---|---|
| Transmission Mode | SNR | Ricean K Factor | $\tau_{RMS}$ | Doppler Frequency |
| Mode 1 | 0-2 | 0 | 50ns | 20 |
| Mode 2 | 0-4 | 0 | 50ns | 20 |
| Mode 3 | 0-4 | 0 | 50ns | 20 |
| Mode 4 | 0-6 | 0 | 50ns | 20 |
| Mode 5 | 0-6 | 0 | 50ns | 20 |
| Mode 6 | 0-8 | 0 | 50ns | 20 |
| Mode 7 | 0-10 | 0 | 50ns | 20 |
| Mode 1 | 0-1 | 0 | 50ns | 30 |
| Mode 2 | 0-2 | 0 | 50ns | 30 |
| Mode 3 | 0-4 | 0 | 50ns | 30 |
| Mode 4 | 0-6 | 0 | 50ns | 30 |
| Mode 5 | 0-8 | 0 | 50ns | 30 |
| Mode 6 | 0-8 | 0 | 50ns | 30 |
| Mode 7 | 0-10 | 0 | 50ns | 30 |
| Mode 1 | 0-2 | 0 | 100ns | 20 |
| Mode 2 | 0-6 | 0 | 100ns | 20 |
| Mode 3 | 0-6 | 0 | 100ns | 20 |
| Mode 4 | 0-6 | 0 | 100ns | 20 |
| Mode 5 | 0-8 | 0 | 100ns | 20 |
| Mode 6 | 0-10 | 0 | 100ns | 20 |
| Mode 7 | 0-12 | 0 | 100ns | 20 |
| Mode 1 | 0-2 | 0 | 100ns | 30 |
| Mode 2 | 0-6 | 0 | 100ns | 30 |
| Mode 3 | 0-8 | 0 | 100ns | 30 |
| Mode 4 | 0-10 | 0 | 100ns | 30 |
| Mode 5 | 0-12 | 0 | 100ns | 30 |
| Mode 6 | 0-12 | 0 | 100ns | 30 |
| Mode 7 | 0-12 | 0 | 100ns | 30 |

FIG. 2

| Exemplary Parameter Values for Guaranteed Satisfactory Transmission for Exact Parametric Channel Estimation | | | | |
|---|---|---|---|---|
| Transmission Mode | SNR | Ricean K Factor | $\tau_{RMS}$ | Doppler Frequency |
| Mode 1 | 2-5 | 0 | 50ns | 20 |
| Mode 2 | 4-13 | 0 | 50ns | 20 |
| Mode 3 | 4-8 | 0 | 50ns | 20 |
| Mode 4 | 6-18 | 0 | 50ns | 20 |
| Mode 5 | 6-11 | 0 | 50ns | 20 |
| Mode 6 | 8-18 | 0 | 50ns | 20 |
| Mode 7 | 10-22 | 0 | 50ns | 20 |
| Mode 1 | 1-9 | 0 | 50ns | 30 |
| Mode 2 | 2-18 | 0 | 50ns | 30 |
| Mode 3 | 4-12 | 0 | 50ns | 30 |
| Mode 4 | 6-22 | 0 | 50ns | 30 |
| Mode 5 | 8-16 | 0 | 50ns | 30 |
| Mode 6 | 8-22 | 0 | 50ns | 30 |
| Mode 7 | 10-26 | 0 | 50ns | 30 |
| Mode 1 | 2-6 | 0 | 100ns | 20 |
| Mode 2 | 6-12 | 0 | 100ns | 20 |
| Mode 3 | 6-10 | 0 | 100ns | 20 |
| Mode 4 | 6-18 | 0 | 100ns | 20 |
| Mode 5 | 8-12 | 0 | 100ns | 20 |
| Mode 6 | 10-18 | 0 | 100ns | 20 |
| Mode 7 | 12-20 | 0 | 100ns | 20 |
| Mode 1 | 2-11 | 0 | 100ns | 30 |
| Mode 2 | 6-20 | 0 | 100ns | 30 |
| Mode 3 | 8-14 | 0 | 100ns | 30 |
| Mode 4 | 10-22 | 0 | 100ns | 30 |
| Mode 5 | 12-18 | 0 | 100ns | 30 |
| Mode 6 | 12-24 | 0 | 100ns | 30 |
| Mode 7 | 12-28 | 0 | 100ns | 30 |

FIG. 3

| Exemplary Parameter Values for Guaranteed Satisfactory Transmission for Simplified Channel Estimation ||||
|---|---|---|---|
| SNR | Ricean K Factor | $\tau_{RMS}$ | Doppler Frequency |
| moderate | 0 | high | moderate |
| low | 0 | moderate | n/a |

FIG. 4

| Transmission | Modulation | Coding rate R | Nominal bit rate [Mbit/s] | Coded bits per sub-carrier $N_{CBPS}$ | Coded bits per OFDM symbol $N_{CBPS}$ | Data bits per OFDM symbol $N_{CBPS}$ |
|---|---|---|---|---|---|---|
| Mode 1 | BPSK | 1/2 | 6 | 1 | 48 | 24 |
| Mode 2 | BPSK | 3/4 | 9 | 1 | 48 | 36 |
| Mode 3 | QPSK | 1/2 | 12 | 2 | 96 | 48 |
| Mode 4 | QPSK | 3/4 | 18 | 2 | 96 | 72 |
| Mode 5 | 16QAM | 9/16 | 27 | 4 | 192 | 108 |
| Mode 6 | 16QAM | 3/4 | 36 | 4 | 192 | 144 |
| Mode 7 | 64QAM | 3/4 | 54 | 6 | 288 | 216 |

METHOD FOR ESTIMATING WIRELESS CHANNEL PARAMETERS

CROSS-REFERENCE TO RELATED APPLICATION

This application claims the benefit of U.S. Provisional Patent Application No. 60/605,512 filed Aug. 31, 2004.

BACKGROUND OF THE INVENTION

1. Field of the Invention

The present invention relates generally to communication systems and more particularly to a method for comprehensive estimation of independent channel parameters.

2. Prior Art

In a multi-path environment of a wireless system, there is a need to evaluate the channel conditions, and provide a set of parameters that give an indication of the quality of the channel. Each of the channels that may be used is checked and then those having the best transmission results may be selected for communication. The understanding of the channel quality is particularly important in order to ensure the correct operation of a wireless system using orthogonal frequency division multiplexing (OFDM). In this case, multiple frequencies are multiplexed in a relatively narrow band, collectively forming a wide band transmission link. Environmental impact on the transmitted signal raises the need for timing synchronization, used to position the signal in an optimum sampling window and further ensure phase alignment of the signals. It is therefore essential to understand the channel characteristics so as to provide the necessary parameters to the wireless system for the necessary adjustments.

Roy III et al. show in U.S. Pat. No. 4,750,147 a technique based on maximum likelihood entropy principles, or subspaces, for the estimation of sinusoid signal parameters. Therefore, this technique cannot be directly applied to the estimation of signal parameters in an OFDM system. This is because the technique is directed toward extracting all of the signal transmission channel parameters. It is well-known in the art that there is insufficient data to realize such an approach. Even if it is assumed to be possible, extracting all the signal transmission channel parameters would naturally require a significant amount of data from the measurements. This would necessarily lead to a complex implementation which may further lead to a slower than desirable response time.

In U.S. Pat. No. 6,587,526, Li et al. suggest a different approach, noting that it is impractical to handle all the possible channel parameters in an OFDM system. Li et al. suggest to overcome prior art deficiencies by employing an arrangement and a method that does not require the estimation of all the signal transmission channel parameters. More specifically, a rotational invariance arrangement or technique that utilizes either spectral, and/or temporal, and/or spatial diversity present in the wireless system, is used to generate a single prescribed parameter of the mobile signal transmission channel. In one of the embodiments of the invention disclosed by Li et al. the single prescribed parameter of the signal transmission channel is the delay that is substantially constant over the diversity, while the gain of each signal transmission channel path may vary.

Figure 5:
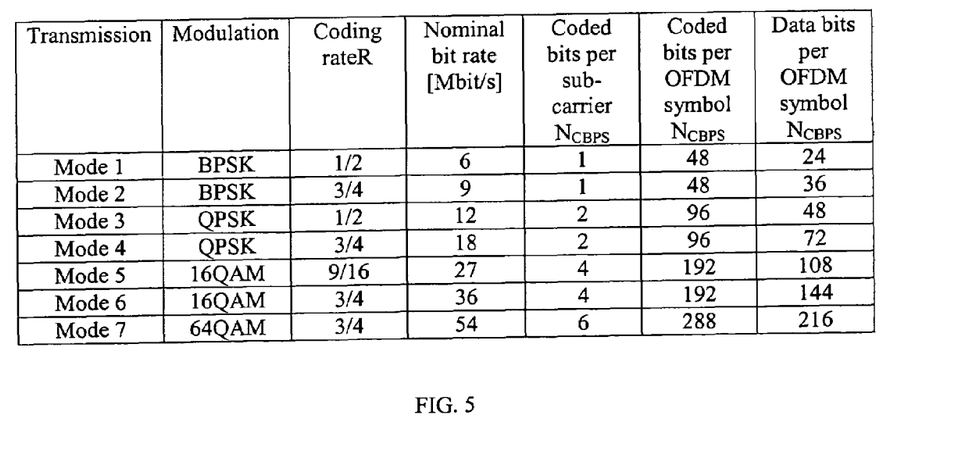
FIG. 5 is a table containing exemplary mode parameters for the HiperLAN/2 standard.

There are many parameters in an OFDM system to be uniquely identified. The different operation modes, for example for a HiperLAN/2 standard, are shown with reference to FIG. 5. The limitations of the prior art go between complex systems that require the estimation of all the parameters, to simpler solutions that select a single prescribed parameter for estimation purposes. There are well-known coarse, simplified, and exact channel estimation methods, each employed separately from each other, and without consideration of when one should be used over the other as channel estimation takes place. A coarse channel estimation is generally referred to as a case where the channel estimation is not very accurate and has a low computational budget, however, it must be recalculated for each time there is need for a channel estimation. Exemplary and non-limiting discussions of coarse channel estimation may be found in "*Channel Quality Estimation and Rate adaptation for Cellular Mobile Radio*", by K. Balachandran, S. et al., IEEE Journal on Selected Areas in Communications, vol. 17, no. 7, July 1999, pp. 1244-1256, and "*A Novel OFDM Transmission Scheme with Length Adaptive Cyclic Prefix*", by Zahng, Z. and Lai, L., Journal of Zhejiang University SCIENCE, 2004, Vol. 5(11), pp. 1336-1342. Exemplary and non-limiting discussions of simplified channel estimation may be found in "*A Reduced Complexity Channel Estimation for OFDM Systems with Transmit Diversity in mobile Wireless Channels*", by Minn, H. et al., IEEE Transactions on Communications, vol. 50, no 5, May 2002, pp. 799-807, "*An Investigation into Time-Domain Approach for OFDM Channel Estimation Approach*", by Minn, H. and Bhargava, V., IEEE Transactions on Broadcasting, vol. 46, no 4, December 2000, pp. 240-248, and "*A Low-Complexity ML Channel Estimator for OFDM*", by Luc Deneire et al., IEEE Transactions on Communications, Vol. 51, No. 2, February 2003, pp. 135-140. Exemplary and non-limiting discussions of exact parametric channel estimation may be found in "*Estimation of Multipath Parameters in Wireless Communications*", by Vanderveen, M. C. et al., IEEE Transactions on Signal Processing, vol. 46, no. 3, March 1998, pp. 682-691, and "*Multichannel MLSE Equalizer with Parametric FIR Channel Identification*", by Chen, J. et al., IEEE Transactions on Vehicular Technology, vol. 48, no. 6, November 1999, pp. 1923-1935. Exemplary and non-limiting discussions of exact detailed channel estimation may be found in "*A Two-Stage Receiver for Co-channel Interference Cancellation in Space-Time Block-Coded Systems over Frequency Selective Channels*", by de Almeida, A. L. F et al., XX Simposio Brasileiro De Telecomunicaciones—05-08 De Outubro De 2003, Rio De Janeiro, "*Channel Estimation Using Pilot Tones in OFDM Systems*", by Yeh, C. and Lin, Y., IEEE Transactions on Broadcasting, vol. 45, no. 4, December 1999, pp. 400-409, "*A Comparison of Pilot-Aided Channel Estimation Methods for OFDM Systems*", by Morelli, M. and Mengali, U., IEEE Transactions on Signal Processing, vol. 49, no. 12, December 2001, pp. 3065-3073, "*Pilot Tone Selection for Channel Estimation in a Mobile OFDM System*", by Negi, R. and Cioffi, J., IEEE Transaction on Consumer Electronics, vol. 44, no. 3, August 1998, pp. 1122-1128, and "*On channel estimation in OFDM systems*", by Edfors, O. et al., proc. of Vehicular Technology Conf., 1995, pp. 815-819. Exemplary and non-limiting discussions of discrete Fourier transform (DFT) based exact channel estimation may be found in "*Analysis of DFT-Based Channel Estimators for OFDM*", by Van de Beek, J. J. et al., Kluwer Academic Publishers, Wireless Personal Communications 12, 2000, pp. 55-70. Other known prior art deals with specific aspects of channel estimation, but none provide a comprehensive channel estimation solution.

The disclosures of the foregoing references are hereby incorporated herein by reference.

There is therefore a need in the art to provide a method to allow a flexible and comprehensive solution that estimates the channel parameters based on the specific characteristics of a channel. It would be further advantageous if such a solution would allow for various levels of parameter extractions based on the specific needs of a wireless channel.

DETAILED DESCRIPTION OF THE PREFERRED EMBODIMENTS

To overcome the limitations of prior art solutions, it is necessary to have the ability to evaluate different types of channel estimation parameters in order to assure a sufficient performance level of a wireless system. The estimation typically involves the finding of the channel impulse response (CIR), which can then be applied to the received signal using, for example, certain weight factors, to improve reception. As noted above, while there are well-known coarse, simplified, and exact channel estimation methods, each is employed separately from each other, and without consideration of when one should be used over the other as channel estimation takes place.

Therefore, the solutions provided by the present invention address this issue by first performing a coarse channel estimation, and if this yields good enough results, then another channel can be checked. A coarse channel estimation in accordance with the preferred embodiment of the disclosed invention is provided below. Otherwise, a more detailed channel estimation takes place, depending on the type of results initially received for the channel and as explained in further detail below. Upon completion of the handling of one channel, the next channel is checked. After checking all the channels, it is possible to begin channel estimation from the first channel or terminate the process as may be required. It should be further noted that depending on the Transmission Mode, for example as shown with respect to FIG. 5, the signal-to-noise ratio (SNR) limits for choosing coarse or exact parametric channel estimation are not the same. This is discussed in more detail below. An advantage of the disclosed invention over prior art is in the ability to select a channel estimation that fits the specific case depending on the evaluation of certain channel parameters.

Figure 1A:
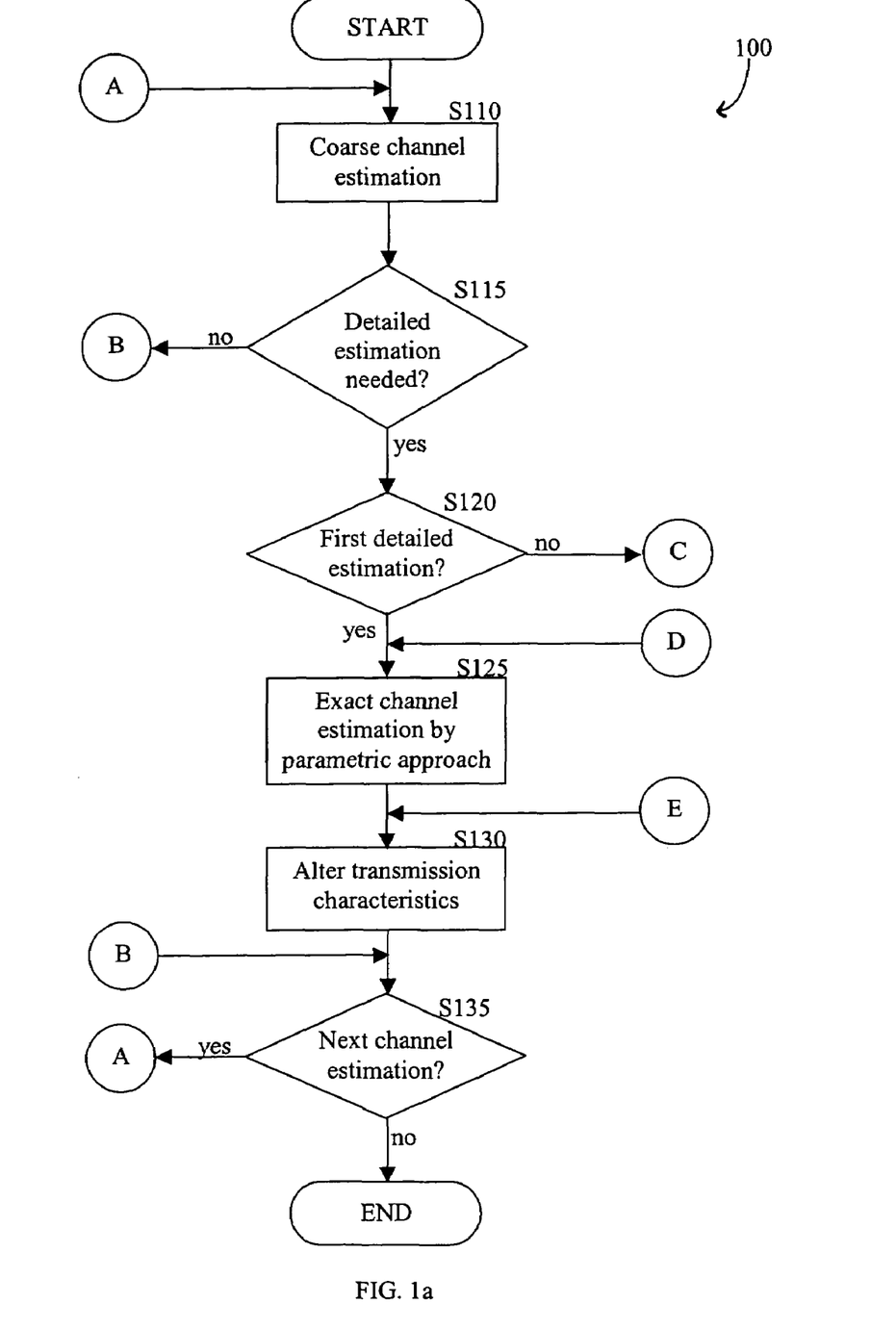
FIGS. 1a and 1b present a flowchart of a channel estimation algorithm in accordance with an embodiment of the invention.
Figure 1B:
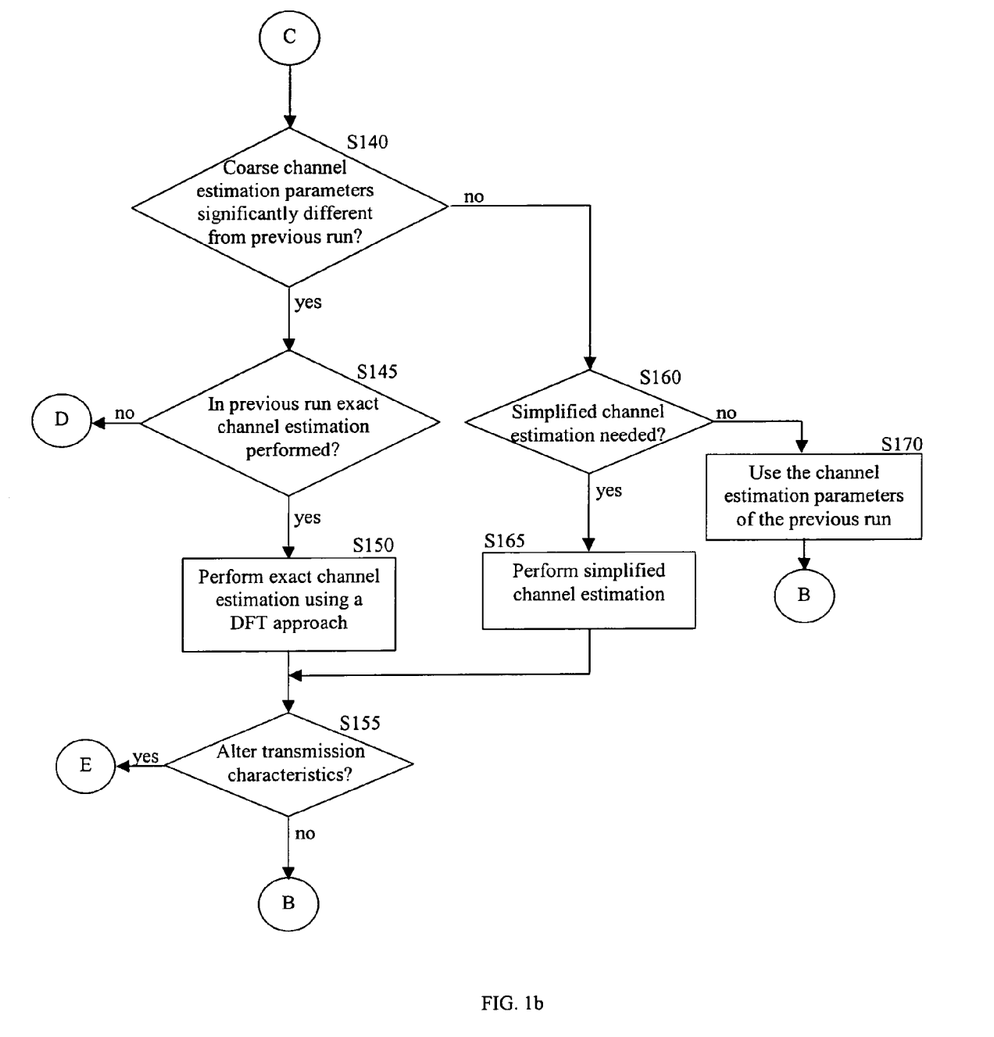

Reference is now made to FIGS. 1a and 1b where an exemplary and non-limiting flowchart of a multi-path channel estimation algorithm is shown. In step S110 a coarse channel estimation is performed. The coarse channel estimation preferably is based upon four generally independent parameters: the signal to noise ratio (SNR), the Ricean K factor, $\tau_{RMS}$, and the Doppler frequency, or at least on one of them. The signal to noise ratio is a comparison of the strength of the received signal to the noise which causes disturbances for good reception. A high SNR means that the signal is clearly separable from the noise and therefore there is a better chance for successful transmission. The Ricean K factor provides an estimation of the fading of the channel assuming a Ricean fading, the K factor assumed to be '0' for the purposes herein, which should not be viewed as limiting the scope of the invention with respect to other values. The $\tau_{RMS}$ parameter provides the most appropriate description of the channel's frequency selectivity. As a result of movement of a mobile unit there are frequency shifts of the wireless bandwidth that are known as the Doppler shifts. If a mobile unit moves at a constant speed, then the Doppler frequency may be calculated. Hence, the Doppler frequency provides an estimation of the effect of motion on the quality of a channel.

Figure 2:
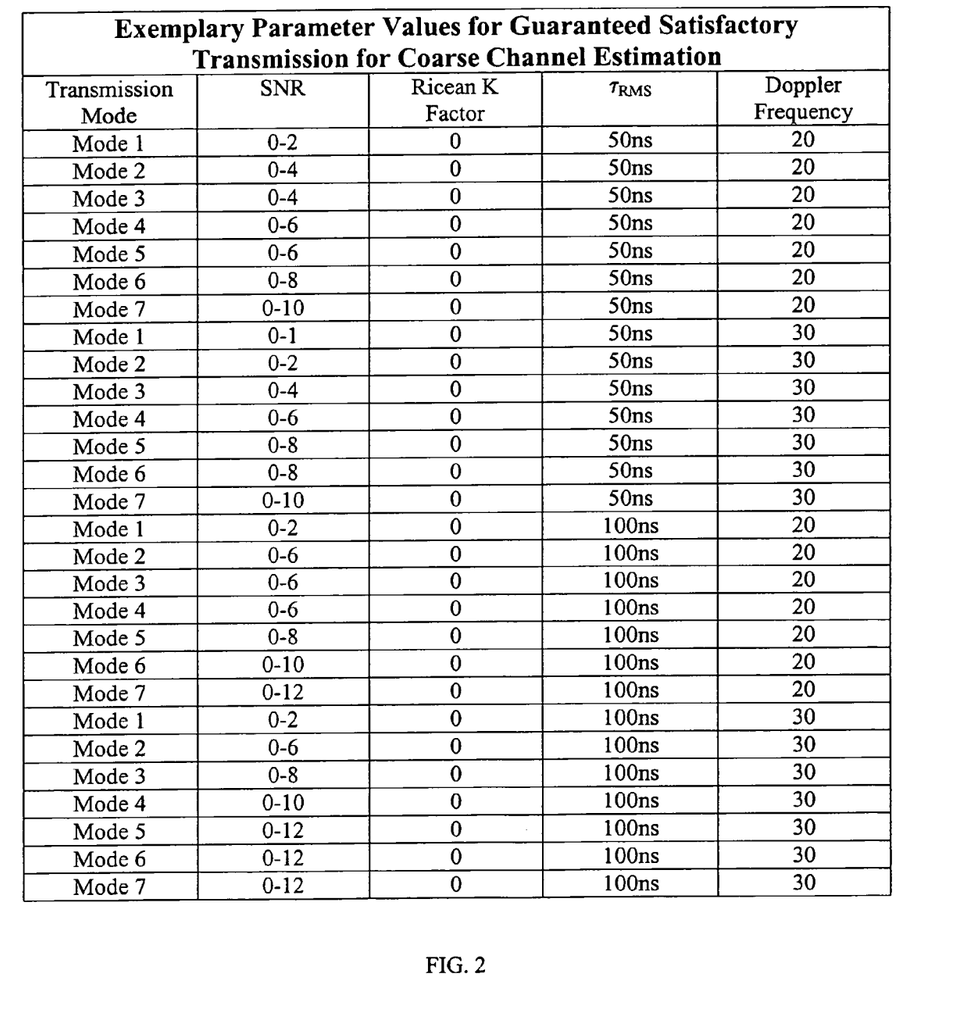
FIG. 2 is an exemplary table of guaranteed satisfactory transmission based on a coarse channel estimation used in accordance with the disclosed invention.

Referring to FIG. 2, an exemplary and non-limiting table of guaranteed satisfactory transmission based on a coarse channel estimation is shown. For example, in the case where the SNR value is high, it is easy to separate the signal from the surrounding noise, and the Doppler frequency is low. According to prior art, coarse estimation is based on the less than accurate estimation of the CIR, using significantly reduced compute power. In accordance with the disclosed invention certain quantitative characteristics of the channel are examined and based on them a decision takes place. Therefore, there is no need to calculate the CIR per se, but the set parameters provide an indication of the CIR without a need to calculate it in the sense shown in prior art solutions. Then in step S115, it is determined if there is any need for a detailed estimation, and if not, execution continues with step S135; otherwise execution continues with step S120. In step S135, it is checked whether an additional channel is to be checked, and if so execution continues with step S110 for the additional channel; otherwise, execution ends.

By means of an example, and without any limitations on the scope of the invention herein, one may consider the following two examples. In a first example, $\tau_{RMS}$ is estimated to be 50 ns, the Doppler Frequency is 30 Hz, and the SNR is 5 dBs. For transmission Mode 5, it may be seen in FIG. 2 that it is possible to achieve adequate transmission under these conditions. Therefore, in accordance to the disclosed invention, coarse channel estimation for the next channel would proceed. In a second example $\tau_{RMS}$ is estimated to be 100 ns, the Doppler Frequency is 20 Hz, and the SNR is 9 dBs. If transmission is to be in Mode 6, it may be seen from FIG. 2 that adequate transmission may be also achieved under these conditions. Therefore, in accordance to the disclosed invention, coarse channel estimation for the next channel would proceed. In the case where the SNR is outside of the range specified, then an exact estimation may be required as explained below.

Figure 3:
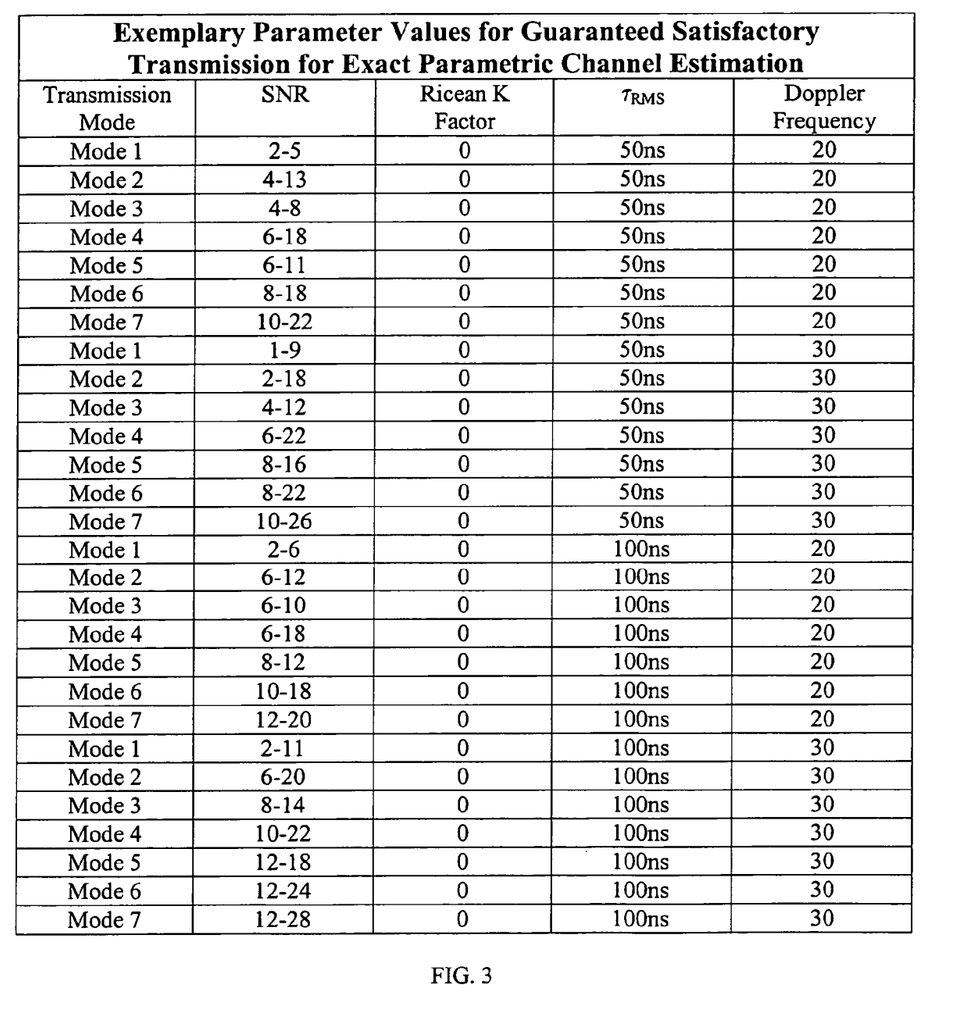
FIG. 3 is an exemplary table of guaranteed satisfactory transmission based on an exact parametric channel estimation used in accordance with the disclosed invention.

Referring again to FIGS. 1a and 1b, if it is determined that a detailed estimation is needed, in step S120 it is determined if a detailed estimation has been previously performed for the same channel, and if not, execution continues with step S125; if a detailed estimation has been previously performed, execution continues with step S140. In step S125 an exact channel estimation is performed using a parametric analysis. An exact channel estimation is performed when a detailed estimation is required because the channel estimation was not sufficient to allow for a satisfactory transmission over the channel. Referring to FIG. 3, an exemplary and non-limiting table of guaranteed satisfactory transmission based on an exact parametric channel estimation may be seen, where the table is used in a similar manner to the table of FIG. 2, but with respect to the exact estimation. The table presents four parameters, namely SNR, $\tau_{RMS}$, Doppler frequency and K Ricean factor estimation, though preferably at least one of those parameters is used. Generally it can be seen that the parametric analysis is used for the cases where the transmission environment is harsh, i.e., most of the parameters estimated in the channel estimation are in a bad condition. This would mean, for example, a low SNR and a high Doppler frequency. Returning back to FIG. 1, execution continues with step S130 where the transmission characteristics (mode) are altered in accordance with the channel parameters that have been estimated. The transmission characteristics are altered in response to the receiver for the purpose of achieving a better transmission performance of the wireless system. Execution continues thereafter with step S135, the function of which was discussed above.

As noted above, in step S120, if the detailed estimation is not the first one for that channel, then execution continues with step S140. In step S140 it is determined whether the coarse channel estimation parameters are sufficiently different from the previous round of estimations made for the same channel, for example different SNR or $\tau_{RMS}$ being sufficiently different from a previous run resulting in a need to use a different transmission mode, and if so, execution continues with step S145; otherwise, execution continues with step S160. A person skilled in the art would note that exact channel estimation is a procedure with a high computational cost. Therefore it would be advantageous to provide the solution that enables the possibility of avoiding the repetition associated with such computation, by performing either a DFT channel estimation analysis or a simplified channel estimation. More specifically, if the coarse channel estimation results in SNR, $\tau_{RMS}$ and Doppler frequency, and K Ricean factor estimation if applicable, that do not cause a need to change the Transmission Mode currently being used, which is the result from the previously run exact channel estimation, then we decide that the estimation parameters are not sufficiently different from the previous run. Conversely, if the coarse channel estimation results in SNR or $\tau_{RMS}$ or Doppler frequency that cause a change to the Transmission Mode currently being used, then the estimation parameters are considered to be sufficiently different from the previous run. An exemplary simplified channel estimation, used in a preferred embodiment, is that disclosed in "A Low-Complexity ML Channel Estimator for OFDM", Luc Deneire et al., IEEE Transactions on Communications, Vol. 51, No. 2, February 2003. Notably, other simplified channel estimations may be used in conjunction with the disclosed invention without departing from its scope.

With respect to the discussion above in conjunction with step S140, the following examples may be considered. In a first non-limiting example, in the first run the SNR is 12, $\tau_{RMS}$ is 50 ns, the Doppler frequency is 20 Hz, and Transmission Mode 4 is used. Then, in a second run the SNR is 11, $\tau_{RMS}$ is 100 ns, and the Doppler frequency is 30. Examining the lines in FIG. 3 respective of the various transmission modes and respective operation ranges, the system may remain in Transmission Mode 4. Therefore there is no need to switch transmission modes by going, for example, to a higher Transmission Mode such as 5, 6 or 7. This is because the altered transmission characteristics do not favor these Transmission Modes. Furthermore there is no need to switch to a lower Transmission Mode, such as Transmission Mode 3, as the characteristics of the channel can afford the Transmission Mode currently being used. Thus since there is no apparent need to change transmission modes, it is concluded that the estimation parameters are not sufficiently different from the previous run. In a second non-limiting example, in the first run the SNR is 18, $\tau_{RMS}$ is 50 ns, the Doppler frequency is 20 HZ, and Transmission Mode 7 is used. In a second run the SNR is 22, $\tau_{RMS}$ is 100 ns, and the Doppler frequency is 30. An examination of the information in FIG. 3 results in the conclusion that the system may remain in Transmission Mode 7. Furthermore there would be no need to change transmission modes by going, for example, to Transmission Mode 5. This is because the altered transmission characteristics do not favor Transmission Mode 5. One may note that it would be possible to move to Transmission Mode 6 because the characteristics of the channel favor such a Mode. However, Transmission Mode 7 is generally preferred over Transmission Mode 6 due to its higher bit rate. As the system may remain in the same transmission mode, it is concluded that the estimation parameters are not sufficiently different from the previous run. In general, the transmission mode will remain in or change to the mode with the highest data rate.

In step S145 it is checked whether an exact parametric estimation was performed in a previous round and if not, execution continues with step S125 executing in accordance with the description above; otherwise, execution continues with step S150 where a discrete Fourier transform (DFT) analysis is used for the exact estimation of the channel parameters. Reference now returns to FIG. 1 where in step S155 it is checked whether there is a need to alter transmission characteristics and if so, execution continues with step S130, discussed in detail above; otherwise, execution continues with step S135, discussed in detail above. Channel mode is altered in those cases where such change will result in a better performance of the wireless system.

Figure 4:
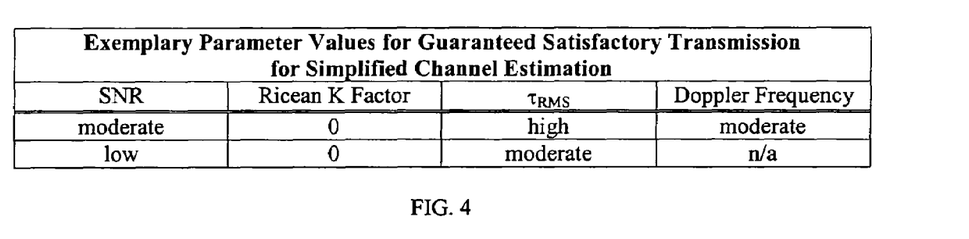
FIG. 4 is an exemplary table of guaranteed satisfactory transmission based on a simplified channel estimation used in accordance with the disclosed invention.

In step S140, if it is noted that the coarse channel estimation parameters are not sufficiently different from the previous run, then execution continues with step S160, as noted above. In step S160 it is determined if there is a need to perform a simplified channel estimation and if so execution continues with step S165; otherwise, execution continues with step S170. Referring to FIG. 4 an exemplary and non-limiting table of guaranteed satisfactory transmission based on a simplified channel estimation is shown. Simplified channel estimation is chosen in, for example, cases where both the SNR and the Doppler frequency are moderate, or when the SNR is low and the $\tau_{RMS}$ is moderate. In step S170, use of the channel parameters calculated in the previous run is determined, and execution continues with step S135, which is explained in detail above. In step S165 the simplified channel estimation is performed. As a result of the estimation of the number of paths in the channel estimation of the parametric analysis, e.g., those performed in step S125, the simplified channel estimation knows how many taps of the channel are useful and can separate the signal subspace from the noisy subspace, enabling a maximum-likelihood (ML) estimator to perform the simplified estimation. Regardless of the method used for the estimation of the exact channel parameters, the exact channel estimation provides the number of paths, the time delay for each path, and the minimum mean square estimation (MMSE) of the channel.

A person skilled in the art would therefore realize the advantages provided by the method shown in respect of FIGS. 1a and 1b as well as the explanation herein. Notably, the method provides decision points for the use of various estimation algorithms and/or methods, based on the specific estimation of the CIR. The invention therefore teaches when to switch between types of channel estimations based on conditions shown with respect of, for example, FIGS. 2, 3 and 4. It should be further noted that in every iteration of the channel estimation process, it is possible to use a different channel estimation algorithm and/or method based on the specific decisions taken with respect to that channel. That is, the ability to select the most suitable channel estimation method and/or algorithm for the current transmission conditions.

Figure 6:
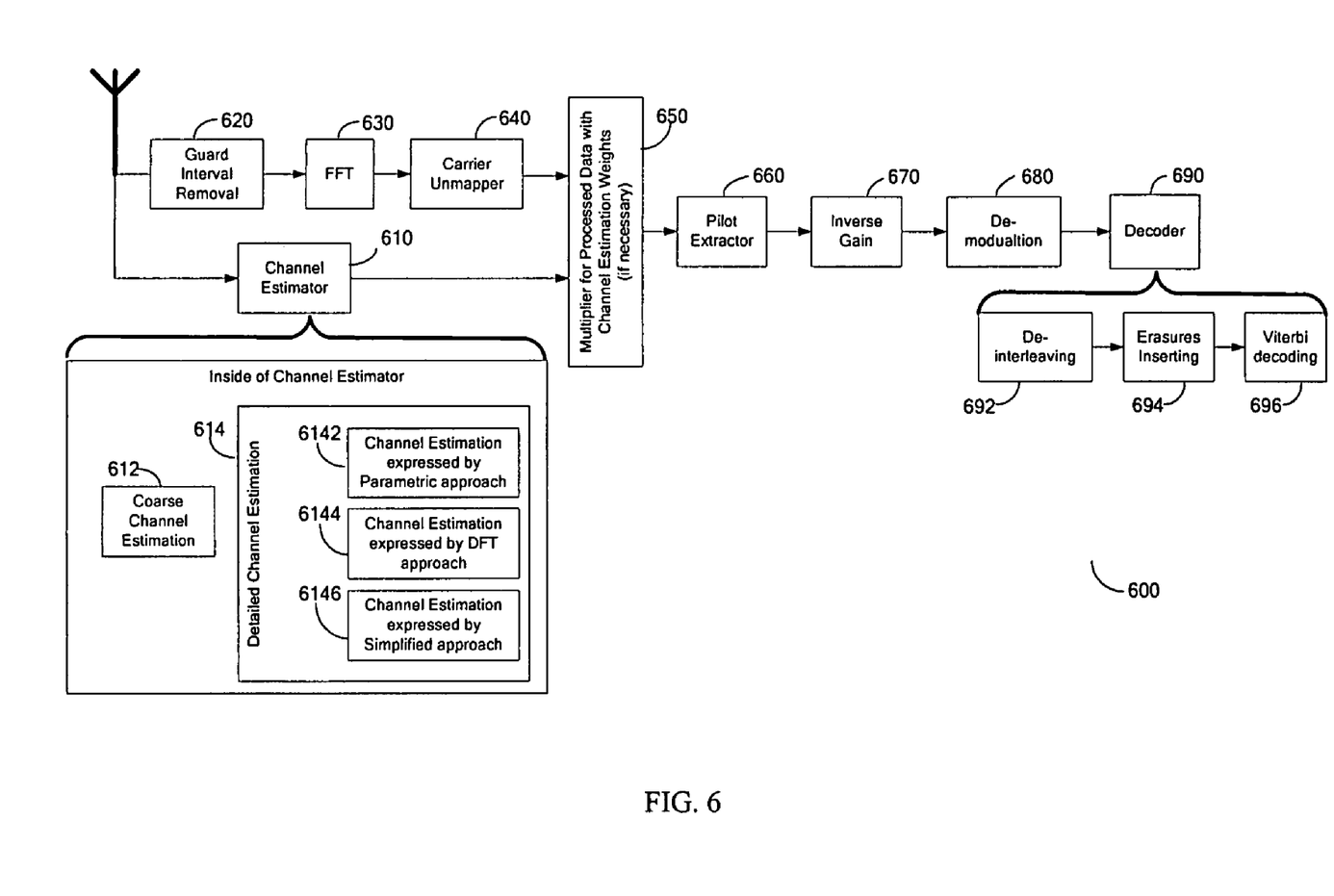
FIG. 6 is an exemplary receiver configured in accordance with the disclosed invention.
Figure 7:
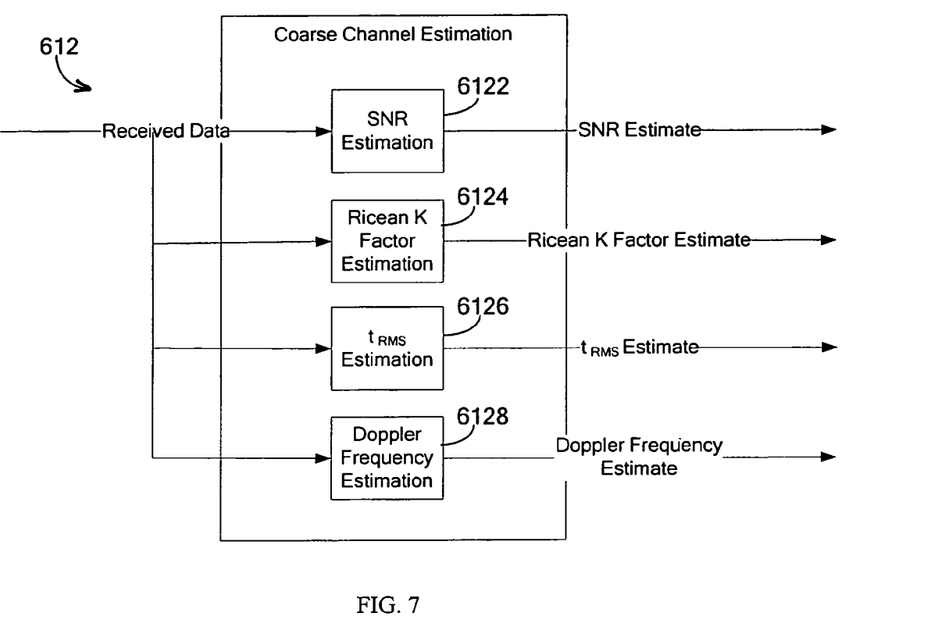
FIG. 7 is a block diagram of an exemplary coarse channel estimator in accordance with the present invention.
Figure 8:
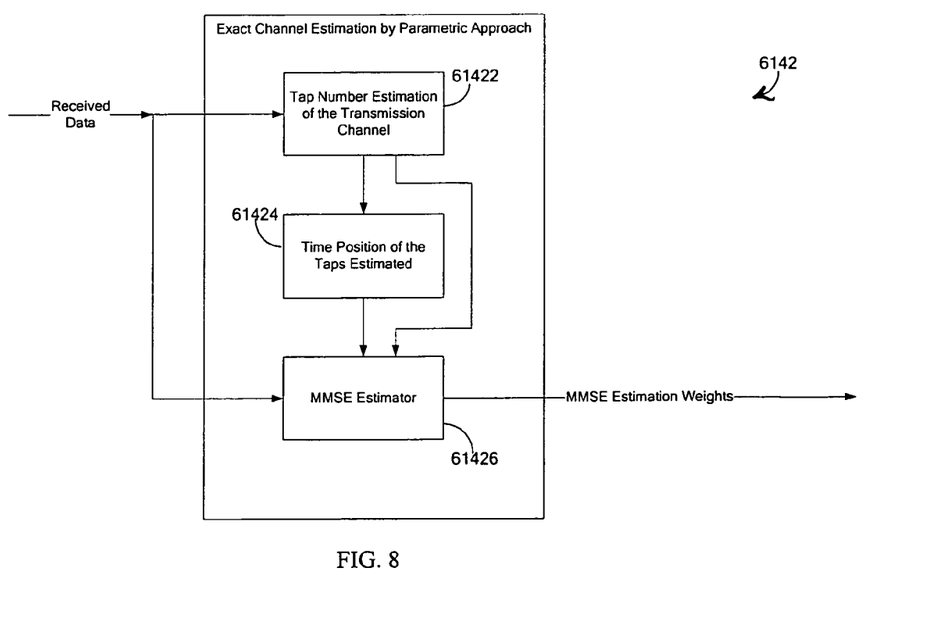
FIG. 8 is a block diagram of an exemplary exact channel estimator in accordance with the present invention.

Reference is now made to FIG. 6 where an exemplary and non-limiting receiver 600 configured with a channel estimator 610 is shown. A person skilled-in-the art would recognize components that comprise transmitter 600 and therefore only those components pertinent to the invention disclosed herein shall be discussed, without limiting the scope of the invention. Specifically, channel estimator 610 is capable of performing a coarse channel estimation 612 and a detailed channel estimation 614. The detailed channel estimation 614 comprises three possible types of channel estimation, the parametric channel estimation 6142, the DFT based channel estimation 6144, and the simplified detailed channel estimation 6146. The operation of channel estimator 610 is in accordance with the method disclosed hereinabove. A multiplier 650 is optionally used to perform a multiplication between the weights provided from channel estimator 610 and the process signal provided from the carrier unmapper 640. Referring to FIG. 7, an exemplary and non-limiting coarse channel estimator 612 is shown, that comprises of a SNR estimation 6122, a Ricean K factor estimation 6124, a $\tau_{RMS}$ estimation 6126, and a Doppler frequency estimation 6128. Each of these blocks provides an estimation for its respective component. Referring to FIG. 8, an exact channel estimator by parametric analysis 6142 is shown, that comprises of a tap number estimation of the transmission channel 61422, a time position of the taps estimated 61424 and a MMSE estimator 61426 that outputs the MMSE estimation weights.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of estimation of channel parameters dependent on the channel conditions in a wireless communication system comprising:
    performing a coarse estimation of a channel's parameters by channel estimator apparatus of the wireless communication system;
    determining if a detailed estimation of the channel's parameters is necessary responsive to performing the coarse estimation, and if so, performing, by the channel estimator apparatus, at least one of a plurality of estimations selected from: a) an exact channel estimation by parametric analysis; b) an exact channel estimation by applying a discrete Fourier transform analysis; c) an exact channel estimation by a simplified channel estimation;
    determining if it is necessary to alter the transmission characteristics responsive of the coarse estimation and/or the detailed estimation of the channel's parameters and if so, altering the transmission characteristics of the wireless communication system;
    wherein the method is repeated for each of the transmission channels in a multi-channel wireless communication system.

2. The method of claim 1 wherein the coarse estimation is performed based on at least one of:
    a) signal-to-noise ratio of the channel,
    b) channel frequency selectivity,
    c) Ricean K factor, and
    d) Doppler frequency.

3. The method of claim 2 wherein the coarse estimation is performed by parametric analysis.

4. The method of claim 2, wherein at least one more coarse estimation is performed based on a not previously utilized estimation method.

5. The method of claim 1 wherein the parametric analysis of the exact channel estimation is performed based on at least, one of:
    a) signal-to-noise ratio of the channel,
    b) channel frequency selectivity,
    c) Ricean K factor, and
    d) Doppler frequency.

6. The method of claim 5, wherein at least one more coarse estimation is performed based on a not previously utilized estimation method for that channel.

7. The method of claim 1 wherein the exact channel estimation is performed by applying a discrete Fourier transform if the coarse channel estimation parameters from a previous estimation are sufficiently different from a current estimation and if in the previous run exact channel estimation was performed.

8. The method of claim 1 wherein the exact channel estimation is performed by simplified channel estimation if the coarse channel estimation parameters from a previous estimation are sufficiently different from a current estimation and if it is determined that a simplified channel estimation is needed.

9. The method of claim 1, wherein if the detailed estimation is the first estimation to be performed, then an exact channel estimation by parametric analysis is performed.

10. The method of claim 1 wherein performing a coarse estimation of a channel's parameters by a channel estimator apparatus of the wireless communication system comprises performing a coarse estimation of a plurality of the channel's parameters by the channel estimator apparatus of the wireless communication system.

11. A multi-channel wireless system having a channel state evaluation operative in a multi-path environment, the system comprising:
    a coarse channel estimator configured to perform a coarse estimation of the channel's parameters;
    a detailed channel estimator configured to determine if a detailed channel estimation is necessary responsive to the coarse estimation, and if so, performing at least one of a plurality of estimations selected from: a) an exact channel estimation by parametric analysis; b) an exact channel estimation by a discrete Fourier transform analysis; c) an exact channel estimation by a simplified channel estimation; then determine if it is necessary to alter the transmission characteristics responsive of the coarse estimation and/or the detailed estimation of the channel's parameters and if so, alter the transmission characteristics of the wireless communication system;
    wherein a channel estimator comprising said coarse channel estimator and said detailed channel estimator is enabled to repeat channel estimation for each of the transmission channels.

12. The wireless system of claim 11 wherein the channel estimator is enabled to perform the coarse estimation based on at least one of:
    a) signal-to-noise ratio of the channel,
    b) channel frequency selectivity,
    c) Ricean K factor, and
    d) Doppler frequency.

13. The wireless system of claim 12 wherein the coarse estimation is done by parametric analysis.

14. The method of claim 12, wherein at least one more coarse estimation is performed based on a not previously utilized estimation method for that channel.

15. The wireless system of claim 11 wherein the parametric analysis of the channel estimator for the exact channel estimation is performed based on at least one of:
   a) signal-to-noise ratio of the channel,
   b) channel frequency selectivity,
   c) Ricean K factor, and
   d) Doppler frequency.

16. The method of claim 15, wherein at least one more coarse estimation is performed based on a not previously utilized estimation method for that channel.

17. The wireless system of claim 11 wherein the wireless system is a receiver.

18. The wireless system of claim 11 wherein the exact channel estimation by applying a discrete Fourier transform is performed if the coarse channel estimation parameters from a previous run are sufficiently different from a current run and if in the previous run exact channel estimation was performed.

19. The wireless system of claim 11 wherein the exact channel estimation by simplified channel estimation is performed if the coarse channel estimation parameters from a previous run are sufficiently different from a current run and if it is determined that a simplified channel estimation is needed.

20. The wireless system of claim 11 wherein if the detailed estimation is the first to be performed then an exact channel estimation by parametric analysis is used.

21. A wireless receiver equipped with the channel estimator of claim 11.

22. The method of claim 11 wherein performing a coarse estimation of a channel's parameters by a channel estimator apparatus of the wireless communication system comprises performing a coarse estimation of a plurality of the channel's parameters by the channel estimator apparatus of the wireless communication system.

* * * * *